United States Patent
Vashi et al.

(10) Patent No.: US 7,139,673 B1
(45) Date of Patent: Nov. 21, 2006

(54) METHOD OF AND CIRCUIT FOR VERIFYING A DATA TRANSFER PROTOCOL

(75) Inventors: Mehul R. Vashi, San Jose, CA (US); Alex Scott Warshofsky, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 10/981,876

(22) Filed: Nov. 5, 2004

(51) Int. Cl.
*G06F 12/00* (2006.01)

(52) U.S. Cl. ...................... 702/122; 711/167
(58) Field of Classification Search ............ None
See application file for complete search history.

(56) References Cited

U.S. PATENT DOCUMENTS

| | | | | |
|---|---|---|---|---|
| 4,063,308 | A * | 12/1977 | Collins et al. | 713/500 |
| 5,276,858 | A * | 1/1994 | Oak et al. | 711/167 |
| 6,088,774 | A * | 7/2000 | Gillingham | 711/167 |
| 6,334,174 | B1 * | 12/2001 | Delp et al. | 711/167 |
| 6,424,198 | B1 * | 7/2002 | Wolford | 327/291 |
| 6,438,670 | B1 * | 8/2002 | McClannahan | 711/167 |
| 6,684,314 | B1 * | 1/2004 | Manter | 711/200 |
| 6,779,096 | B1 * | 8/2004 | Cornelius et al. | 711/167 |
| 6,829,191 | B1 * | 12/2004 | Perner et al. | 365/220 |
| 6,898,682 | B1 * | 5/2005 | Welker et al. | 711/163 |
| 6,934,824 | B1 * | 8/2005 | Woo et al. | 711/168 |
| 6,934,899 | B1 * | 8/2005 | Yuan et al. | 714/734 |
| 2002/0013881 | A1 * | 1/2002 | Delp et al. | 711/105 |
| 2004/0030853 | A1 * | 2/2004 | Welker et al. | 711/163 |

OTHER PUBLICATIONS

U.S. Appl. No. 10/941,240, filed Sep. 15, 2004, Ansari et al.

* cited by examiner

*Primary Examiner*—Carol S. W. Tsai
(74) *Attorney, Agent, or Firm*—John J. King

(57) ABSTRACT

A method of verifying a circuit implementing a data transfer protocol is disclosed. According to one embodiment of the invention, the method comprises steps of providing a block under test that implements a variable latency data transfer protocol; coupling a verification circuit to the block under test; enabling variable latency data transfers to the block under test; and verifying that the block under test is implementing the variable latency data transfer protocol. The method could be implemented to verify the operation of a memory controller of an FPGA, for example. According to another embodiment, a method enabling a multi-stage verification is disclosed. Finally, specific implementations of a verification circuit coupled to an on-chip memory controller of an FPGA are disclosed.

13 Claims, 6 Drawing Sheets

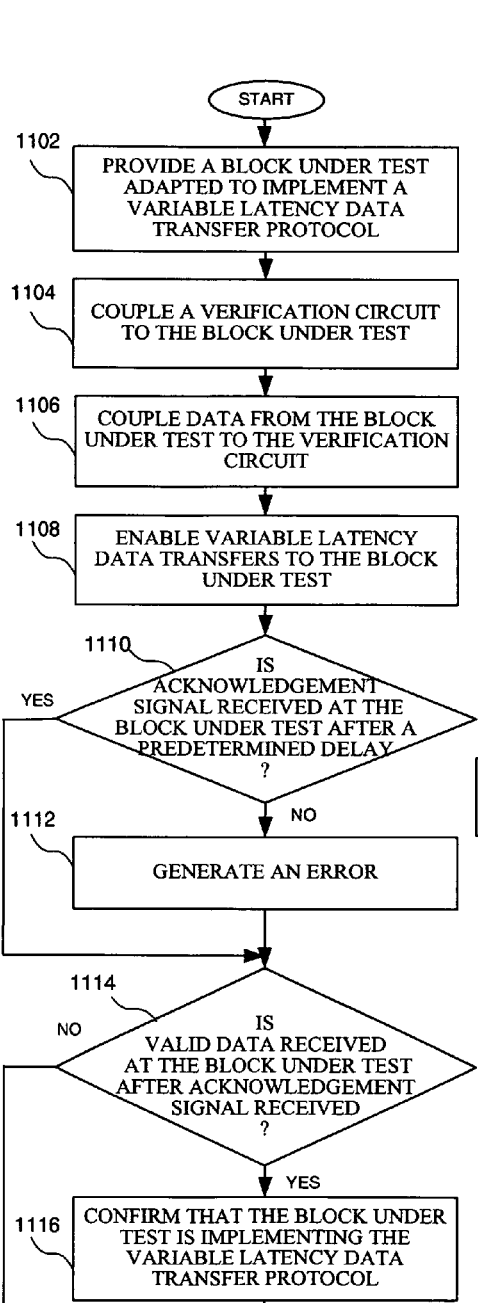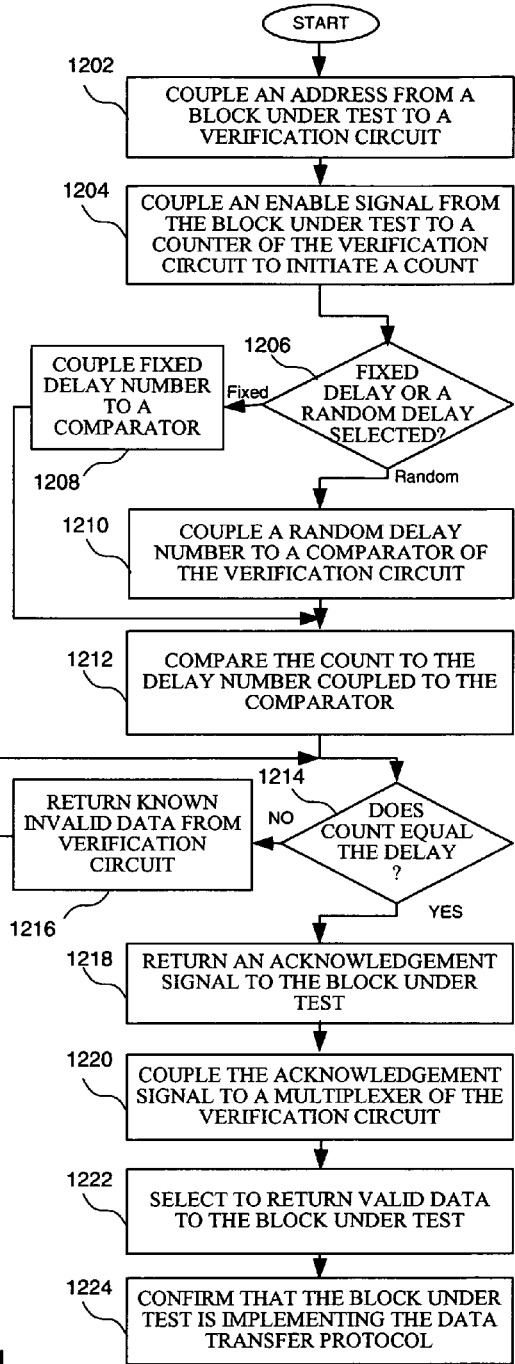
FIG. 11
FIG. 12

METHOD OF AND CIRCUIT FOR VERIFYING A DATA TRANSFER PROTOCOL

FIELD OF THE INVENTION

The present invention relates generally to transferring data in electronic circuits, and in particular, to a method of and circuit for verifying a data transfer protocol.

BACKGROUND OF THE INVENTION

Memories are an intricate part of most electronic systems, and are used to store data for a variety of applications. A random access memory (RAM) is commonly used in an integrated circuit or coupled to an integrated circuit on a printed circuit board. One common integrated circuit making use of a random access memory is a programmable logic device (PLD), such as a field programmable gate array (FPGA) or complex programmable logic device (CPLD). A dedicated random access memory block of a programmable logic device is commonly called a block RAM (or BRAM). When transferring data to or from any memory, it is necessary to ensure that a data transfer protocol is followed to guarantee that the correct data is properly written to or read from the memory. In some integrated circuits, a memory controller provides the function of ensuring that data is properly written to or read from a memory, whether the memory is internal or external to the integrated circuit.

An On-Chip Memory (OCM) controller, which is typically provided on an FPGA having a processor, serves as a dedicated interface between the BRAMs in the FPGA and signals available on an embedded processor. The signals are designed to provide quick access to a fixed amount of instruction and data memory space. The OCM controller, which typically comprises an instruction side on-chip memory (ISOCM) controller and a data side on-chip memory (DSOCM) controller, provides an interface to both an Instruction-Side Block RAM (ISBRAM) and a Data-Side Block RAM (DSBRAM). A designer of an FPGA can choose to implement any combination of ISBRAM and/or DSBRAM. A typical application for a DSOCM controller includes enabling a dual-port feature of BRAM to provide bi-directional data transfers between a processor and circuits of an FPGA.

It is also necessary to confirm that a circuit enabling data transfers is operating properly. A number of predefined data transfer functions (such as circuits implemented in configurable logic commonly called "cores" or intellectual properties (IP)) are often attached to a block under test. Conventional approaches for verifying the operation of a block under test interfacing with an IP is limited to verifying the internal operation of the IP itself, and not how the IP may be used. That is, it is difficult to determine whether the circuit coupled to an IP is properly implementing a data transfer protocol without knowing all of the signaling requirements of the IP. Additionally, it is difficult to provide all the combinations and permutations in which a signal, such as a signal in a variable latency data protocol, can arrive as an input from the IP. Consequently, a large number of test benches are required according to conventional methods to assert a signal in a particular sequence to verify that a circuit is implementing a particular data transfer protocol.

Further, there are also particular problems in transferring data between an IP and a DCOCM controller in a programmable logic device. For example, conventional DSOCM controllers have a fixed latency of operation. That is, data is read from or written to a memory of an FPGA in a fixed number of BRAM clock cycles. A fixed latency approach guarantees that the data load and data store operations are completed in a pre-determined, fixed number of BRAM clock cycles. This guarantees a deterministic performance between the DSOCM controller and on-chip BRAMs of an FPGA, for example. In addition to controlling a BRAM, the DSOCM controller may also interface with other peripheral devices, including for example hardware circuits of the FPGA or external RAM. Depending upon the circuits being controlled by the DSOCM controller, data may be sent to a circuit from the DSOCM controller or received by the DSOCM controller at different rates. However, because conventional DSOCM controllers only provide a fixed latency operation, these conventional DSOCM controllers will operate using conventional data transfer protocols based on a predetermined number of clock cycles.

Accordingly, there is a need for a method of and circuit for verifying a circuit implementing a variable latency data transfer protocol. There is a further need for a method of and circuit for verifying variable latency data transfers in electronic circuits, such as programmable logic devices, which allow different peripherals and on-chip memory to run at different speeds when they are attached to a DSOCM controller.

SUMMARY OF THE INVENTION

According to one embodiment of the invention, a method of verifying a circuit implementing a data transfer protocol is disclosed. The method comprises steps of providing a block under test which implements a variable latency data transfer protocol; coupling a verification circuit to the block under test; enabling variable latency data transfers to the block under test; and verifying that the block under test is implementing the variable latency data transfer protocol. The method could be implemented to verify the operation of a memory controller of a programmable logic device, for example.

According to another embodiment of the invention, a method of verifying a circuit implementing a data transfer protocol comprises steps of coupling an address from a block under test to a verification circuit; returning an acknowledge signal after a predetermined amount of time; returning data to the block under test; and verifying that the block under test is implementing the data transfer protocol. According to alternate embodiments, methods of enabling a multi-stage verification are disclosed.

Circuits for verifying a data transfer protocol are also disclosed. According to one embodiment, the circuit comprises a memory coupled to receive an address from a block under test; a counter coupled to receive an enable signal from the block under test; and a comparator coupled to receive a delay number and the output of the counter. A circuit enabling a multi-stage verification of a block under test is also described. Finally, specific implementations of a verification circuit coupled to an on-chip memory controller of a programmable logic device are disclosed.

BRIEF DESCRIPTION OF THE DRAWINGS

FIG. 11 is a flow chart showing a method of verifying a circuit implementing a data transfer protocol according to an embodiment of the present invention;

FIG. 12 is a flow chart showing a method of verifying a circuit implementing a data transfer protocol using a single stage delay circuit according to an embodiment of the present invention.

DETAILED DESCRIPTION OF THE DRAWINGS

Figure 1:
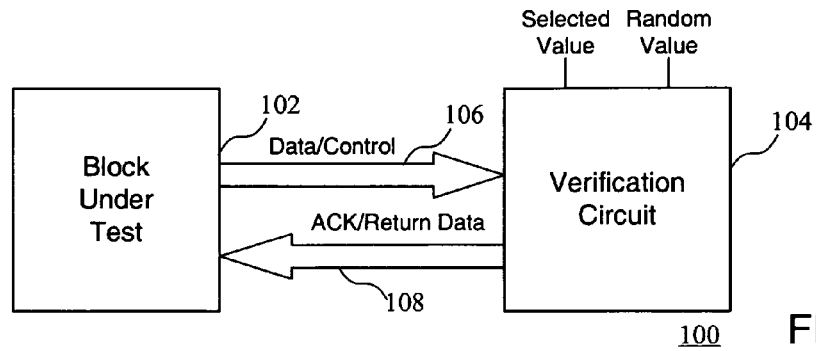
FIG. 1 is a block diagram of a circuit for verifying a data transfer protocol.

Turning first to FIG. 1, a block diagram of a circuit 100 for verifying a data transfer protocol is disclosed. In particular, a block under test 102 is coupled to a verification circuit 104. The block under test 102 couples control and data signals 106 to the verification circuit, which returns acknowledge and return data signals 108. As will be described in more details below, the circuit 100 accommodates variable latency data transfers, as disclosed in co-pending U.S. patent application Ser. No. 10/941,240 entitled "A METHOD AND CIRCUIT FOR ENABLING VARIABLE LATENCY DATA TRANSFERS", filed on Sep. 15, 2004 by Ansari et al. by the Assignees of the present application, the entire application of which is incorporated by reference in this application. The variable latency data transfer features described in the above co-pending application enable a new set of data transfer applications, such as data transfers to or from a DSOCM controller. Accordingly, it is necessary to determine that a circuit, such as a DSCOM controller, is successfully implementing the data transfer protocol.

The circuit of FIG. 1 preferably verifies a circuit implementing a variable latency data transfer, such as a DSOCM controller in an embedded processor based FPGA. Specifically, a register transfer language (RTL) based verification technique enables mimicking a variable latency bus protocol. By mimicking the bus protocol, the circuit can implement all of the scenarios of transferring data by a user. The circuit of FIG. 1 also provides a mechanism for verifying embedded IPs with a minimum set of logic, while also providing high functional coverage. The RTL code preferably uses existing processor verification environment to ensure that no re-work is needed in platform-based processor design verification. By passing a value to the verification circuit in order to change a parameter, such as a delay, a single piece of RTL code can be used to simulate any IP which may be attached to the block under test.

Further, ensuring that a block under test is properly implementing variable latency transfers provides a user with a high degree of flexibility by allowing data transfers to be completed in a variable number of clock cycles. One significant advantage of the variable latency feature is the flexibility of the end user to use a DSOCM controller-based system. For example, it allows a user to tradeoff performance versus area parameters for their system. Considering that a number of predefined functions with various latencies are often attached to a conventional DSOCM controller operating in a fixed latency mode, the performance of the programmable logic device is dictated by the slowest IP in the system. By verifying circuits that enable variable latency data transfers, the circuits and method of the present invention allow IPs to run at their own speed.

Figure 2:
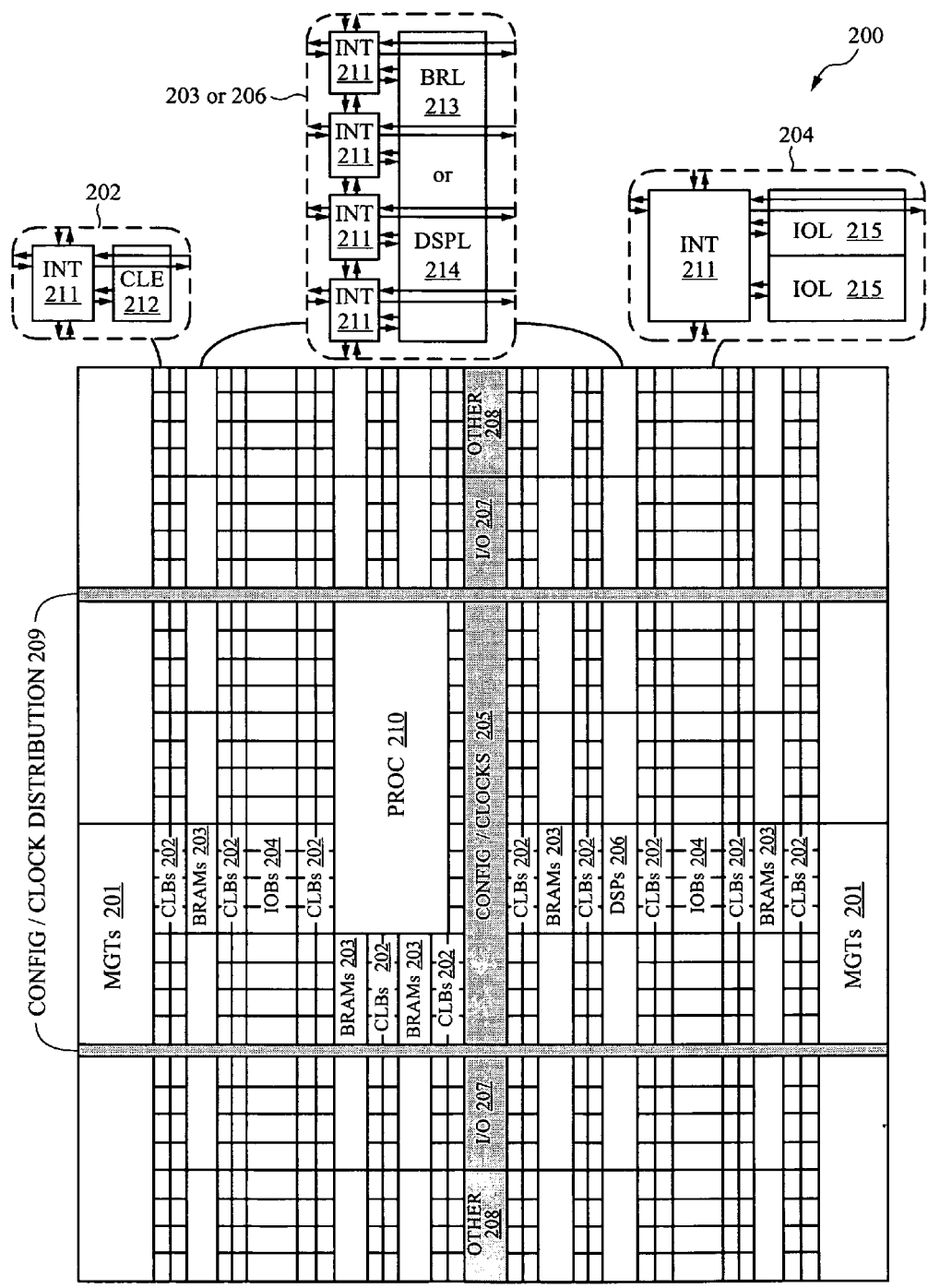
FIG. 2 is a block diagram of a circuit that could implement circuits and methods for enabling verifying a data transfer protocol according to an embodiment of the present invention.

Turning now to FIG. 2, a block diagram of a circuit that could implement circuits and methods according to an embodiment of the present invention is shown. In particular, advanced FPGAs can include several different types of programmable logic blocks in the array. For example, FIG. 2 illustrates an FPGA architecture 200 that includes a large number of different programmable tiles including multi-gigabit transceivers (MGTs 201), configurable logic blocks (CLBs 202), random access memory blocks (BRAMs 203), input/output blocks (IOBs 204), configuration and clocking logic (CONFIG/CLOCKS 205), digital signal processing blocks (DSPs 206), specialized input/output blocks (I/O 207) (e.g., configuration ports and clock ports), and other programmable logic 208 such as digital clock managers, analog-to-digital converters, system monitoring logic, and so forth. Some FPGAs also include dedicated processor blocks (PROC 210), such as a PowerPC™ processor available from IBM Corporation.

In some FPGAs, each programmable tile includes a programmable interconnect element (INT 211) having standardized connections to and from a corresponding interconnect element in each adjacent tile. Therefore, the programmable interconnect elements taken together implement the programmable interconnect structure for the illustrated FPGA. The programmable interconnect element (INT 211) also includes the connections to and from the programmable logic element within the same tile, as shown by the examples included at the top of FIG. 2.

For example, a CLB 202 can include a configurable logic element (CLE 212) that can be programmed to implement user logic plus a single programmable interconnect element (INT 211). A BRAM 203 can include a BRAM logic element (BRL 213) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 206 can include a DSP logic element (DSPL 214) in addition to an appropriate number of programmable interconnect elements. An IOB 204 can include, for example, two instances of an input/output logic element (IOL 215) in addition to one instance of the programmable interconnect element (INT 211). As will be clear to those of skill in the art, the actual I/O pads connected, for example, to the I/O logic element 215 are manufactured using metal layered above the various illustrated logic blocks, and typically are not confined to the area of the input/output logic element 215.

In the pictured embodiment, a columnar area near the center of the die (shown shaded in FIG. 2) is used for configuration, clock, and other control logic. Horizontal areas 209 extending from this column are used to distribute the clocks and configuration signals across the breadth of the FPGA. Some FPGAs utilizing the architecture illustrated in FIG. 2 include additional logic blocks that disrupt the regular columnar structure making up a large part of the FPGA. The additional logic blocks can be programmable blocks and/or dedicated logic. For example, the processor block PROC 210 shown in FIG. 2 spans several columns of CLBs and BRAMs. Note that FIG. 2 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 2 are purely exemplary. For example, in an actual FPGA more than one adjacent column of CLBs is typically included wherever the CLBs appear, to facilitate the efficient implementation of user logic.

Figure 3:
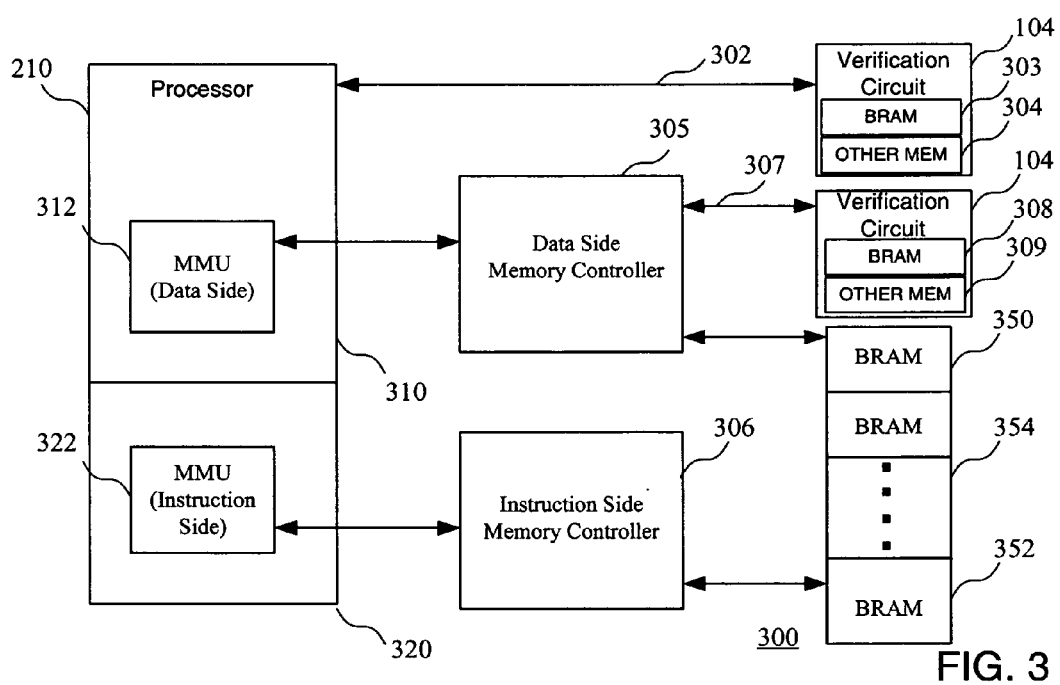
FIG. 3 is a block diagram of a circuit having a DSOCM controller according to an embodiment of the present invention.

Turning now to FIG. 3, a block diagram of circuit having a DSOCM controller according to an embodiment of the present invention is shown. In a circuit for verifying a block under test according to one embodiment of the present invention, a processor 210 is coupled by way of a processor local bus (PLB) 302 to a verification circuit 104 having a memory, such as a BRAM 303 or other memory 304. The verification circuit 104, as will be described in more detail in reference to FIGS. 5 and 8, for example, could be used for verifying that the processor is successfully implementing a desired data transfer protocol, such as a variable latency data transfer protocol. A separate memory controller is preferably used for a data side and an instruction side of a circuit implementing the verification circuit of the present invention, such as an FPGA. In particular, a processor 210 is coupled to a DSOCM controller 305 and an ISOCM controller 306, each of which interface with a memory. A verification circuit 104 could also be coupled to the DSOCM controller 305 by way of a bus 307. The verification circuit 104 coupled to the DSOCM controller could also comprise a BRAM 308 or other memory 309. The communication between the DSOCM controller 305 and the verification circuit will be described in more detail in reference to FIG. 4 below.

The processor also preferably comprises a separate data side interface 310 and instruction side interface 320. Data side interface 310 preferably comprises a memory management unit 312, while instruction side interface 320 also comprises a memory management unit 322. Finally, BRAMs of the circuit could comprise a portion 350 which may be used for data, another portion 352 which may be used for instructions, and a remaining portion 354 may be used for other purposes. Portions 350, 352, and 354 may have different address depths and memory sizes.

Figure 4:
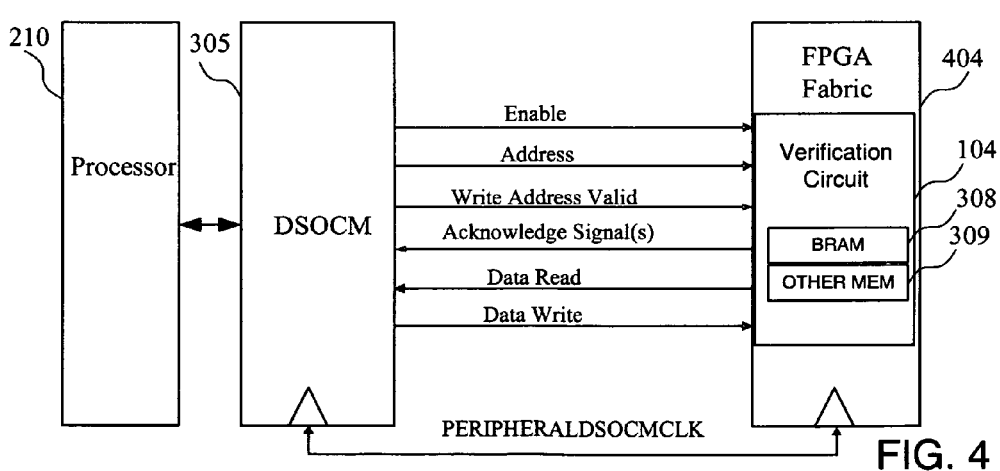
FIG. 4 is a block diagram showing the transfer of data and control signals between a DSOCM controller and a verification circuit according to an embodiment of the present invention.

Turning now to FIG. 4, a block diagram shows the transfer of data and control signals enabling variable latency data transfers between a DSOCM controller and a verification circuit according to an embodiment of the present invention. In particular, a DSOCM controller 305 is coupled between processor 210 and the FPGA fabric 404. FPGA fabric 404 generally includes circuits for implementing a programmable logic device. The DSOCM controller 305 couples signals enabling writing data to and reading data from the verification circuit 104. In particular, an enable signal enables the verification circuit to receive data written to an address (received on an address bus) by way of a data write bus of the DSOCM controller, as will be described in more detail in reference to FIGS. 5–10. Similarly, data read from the peripheral device is received at the DSOCM controller by way of a data read bus.

Figure 5:
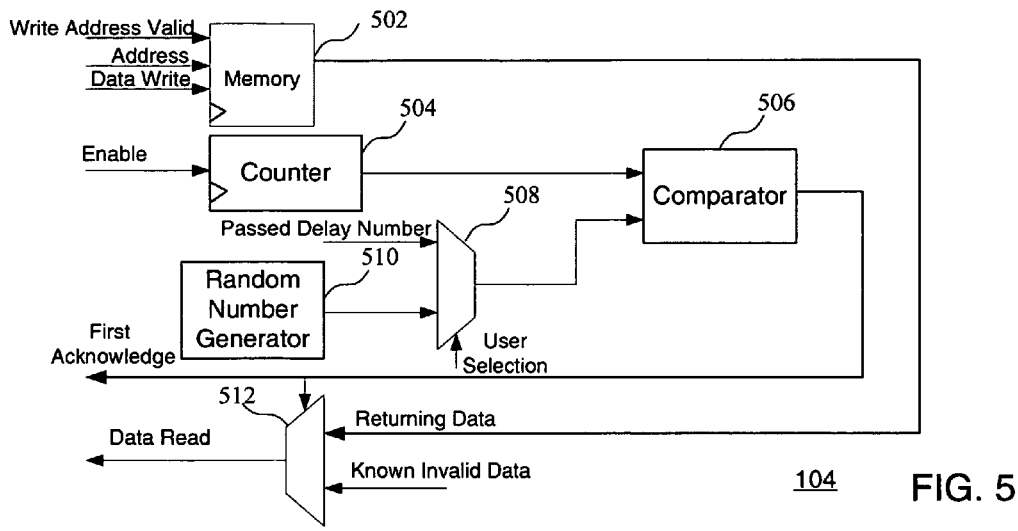
FIG. 5 is a block diagram of a verification circuit according to an embodiment of the present invention.

Turning now to FIG. 5, a block diagram of a verification circuit according to an embodiment of the present invention is shown. In particular, a memory 502 receives an address (and Write Address Valid and Data Write signals if writing), and generates output data which will be returned to the block under test when a first acknowledge signal is generated. Memory 502 could be any type of memory device, such as a BRAM 308 or other memory 309, either on or off the programmable logic device. The first acknowledge signal is generated based upon a certain delay, such as a user selected (i.e. fixed) delay passed to the verification circuit from the block under test, or a random delay. In order to generate the delay according to one embodiment of the invention, a counter 504 receives an enable signal, and generates a count which is coupled to a comparator 506. A multiplexer 508 receives a predetermined delay number selected by a user and a random number generated by random number generator 510. The output of multiplexer 508, which is preferably selected by a user selection signal, is coupled to the comparator 506. When the count generated by counter 504 is equal to the delay number selected by the user, the first acknowledge signal is generated. That is, in order to verify that the block under test is properly implementing a data transfer protocol, the first acknowledge signal is generated after a certain delay (i.e. a fixed delay selected by the user or a random delay) which mimics the protocol. Although the embodiment of FIG. 5 relates to a first acknowledge signal having a delay generated by the verification circuit, the verification circuit could output an acknowledge signal representative of some other parameter to verify that the block under test is implementing the data transfer protocol.

The first acknowledge signal is also coupled to a multiplexer 512 for outputting either the data stored at the address location or known invalid data. The output data is checked to determine that the data is valid. If the block under test receives invalid data when the first acknowledge is valid, the block under test is not operating properly. Known invalid data is also transferred when the first acknowledge signal is not received to insure that block under test is operating properly. That is, if valid data is returned at a time when the first acknowledge signal should not have been received, the block under test would not be functioning properly.

According to one aspect of the invention, the circuit of FIG. 5 provides a user centric approach to the verification of a block under test. That is, by providing a generic test environment that can "mimic" a wide spectrum of applications that could be deployed on a variable latency data transfer protocol interface, a single piece of RTL code can test all of the different combinations of possible inputs to the block under test, such as from an embedded IP in a programmable logic device. In order to implement the circuit of FIG. 5, a parameter is created that can be passed from the simulation environment to the overall RTL code based design. As an example, the number of clock cycles that the data takes to return to a block under test can be varied without needing to write a new piece of code. Each simulation would then represent a different type of known user design. For the "unknown" user application designs that may have a changing delay as a function of time, a random number function is provided. This would ultimately simulate a mixture of unknown different designs attached to the block under test. This random number feature has the advantage of not requiring the development of different pieces of RTL code for different behavior of input stimulus patterns to the block under test. By reducing the RTL code, the time and effort to test the block under test is significantly reduced. Also, if there is a change in the data transfer protocol, it is easy to support any changes by supporting a different range of random functions.

Figure 6:
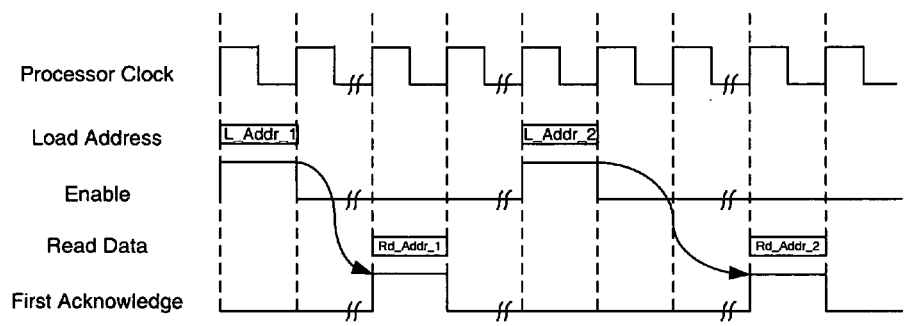
FIG. 6 is a timing diagram showing the verification of a read operation using the verification circuit of FIG. 5 according to an embodiment of the present invention.

As can be seen in the timing diagram of FIG. 6 which shows verifying a read operation of a block under test using the verification circuit of FIG. 5, a processor clock and a load address are coupled to the verification circuit. After an enable signal triggers a read cycle, a first address (L_Addr_1) is provided to the memory 502. After a certain delay, such as a fixed delay selected by user or a random delay based upon a random number generated by the random number generator 510, a first acknowledge signal is generated, and data from the memory location is output by the verification circuit. A second address (L_Addr_2) could also be coupled to the memory 502. As can be seen, the first acknowledge signal for the data in the second address is generated by the verification circuit after a second delay, which may be different from the first delay if the delays are based upon a random number generated by the random number generator.

Figure 7:
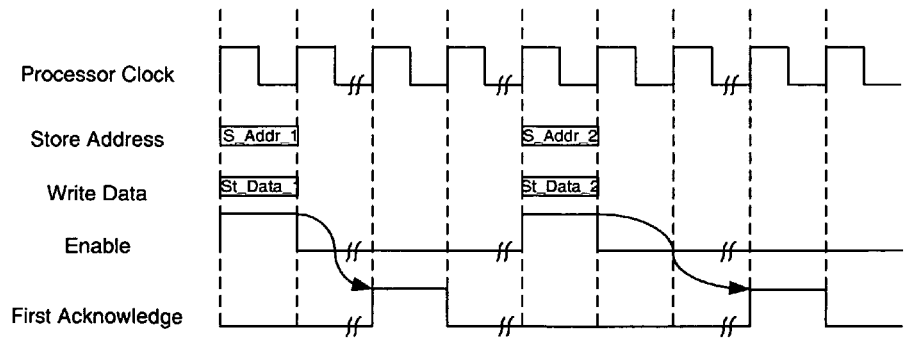
FIG. 7 is a timing diagram showing the verification of a write operation using the verification circuit of FIG. 5 according to an embodiment of the present invention.

As can be seen in the timing diagram of FIG. 7 which shows verifying a write operation using the verification circuit of FIG. 5, a store address (S_Addr_1) and write data signal (St_Data_1) are coupled to the memory of the verification circuit. An enable signal triggers a write cycle for writing the input data to the address of the memory. After a certain delay, which again could be a fixed delay selected by a user or a random delay based upon a random number generated by a random number generator 510, a first acknowledge signal is generated by the verification circuit indicating that the write operation is complete. A second store address (S_Addr_2) and write data signal (St_Data_2) could also be coupled to the memory 502. As can be seen, the first acknowledge signal (indicating that the write operation of the second data is complete) is again generated by the verification circuit after a second delay, which may different from the first delay if the delays are based upon a random number generated by the random number generator. While the circuit of FIG. 5 is one example of a verification circuit for generating various signals to be applied to a block under test, it will be understood that other circuits for generating an acknowledge signal or returning data signals to a block under test could be employed within the spirit and scope of the present invention.

Figure 8:
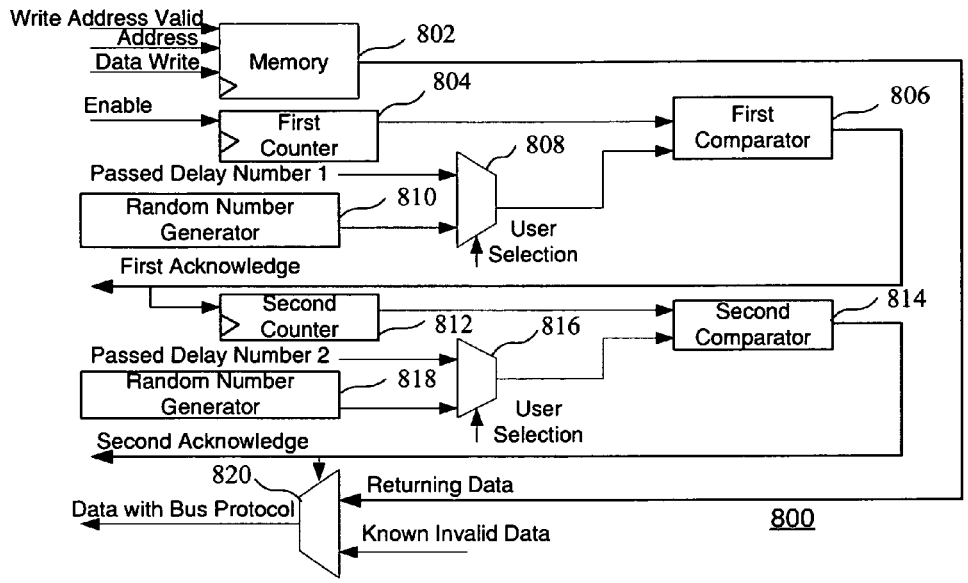
FIG. 8 is a block diagram of a multi-stage verification circuit according to an alternate embodiment of the present invention.

Turning now to FIG. 8, a block diagram of a multi-stage verification circuit according to an alternate embodiment of the present invention is shown. As the number of inputs of a block under test increases, a new random function could be easily added to support that input. Additionally, an entire range of random functions can be exercised by using a single set of simulations, resulting in a significant productivity gain. That is, one block is created that has variables passed to it, rather than separate blocks for each value of the variable. Further, every time a different delay number is required, a new stage could be added. In the example of FIG. 8, there are two outputs, in this case first and second acknowledge signals based on the original enables to the memory. However, the second acknowledge signal is delayed by a certain amount as determined by the delay of the first stage and a fixed delay number selected by the user or a random delay number for the second stage. Although two stages of output circuits are shown, the circuit of FIG. 8 could be expanded to include any number of stages and corresponding output signals that a particular block under test requires.

Referring specifically to FIG. 8, a memory 802 receives an address (and a Write Address Valid and a Data Write signals if writing), and generates output data which will be returned to the block under test when a second acknowledge signal is generated. The first acknowledge signal is generated in a first stage of the circuit based upon a certain delay, such as a user selected delay (i.e. passed delay number 1) or a random delay. In order to generate the delay according to one aspect of the invention, a counter 804 generates a count after receiving an enable signal. The count is coupled to a comparator 806. A multiplexer 808 receives a predetermined delay number selected by a user or a random number generated by random number generator 810. The output of multiplexer 808 (i.e. whether a fixed number or a random number is generated) is preferably selected by a user selection signal and is coupled to the comparator 806. When the count generated by counter 804 is equal to the delay number selected by a user, a first acknowledge signal is generated.

The first acknowledge signal is also coupled to a second stage for generating a second acknowledge signal and outputting either the data stored at the address location or known invalid data. In particular, the first acknowledge is coupled to a second counter 812, which generates a count (upon receiving the first acknowledge signal) which is coupled to a second comparator 814. A multiplexer 816 receives a predetermined delay number selected by a user (i.e. passed delay number 2) or a random number generated by random number generator 818. The output of multiplexer 816 is also preferably selected by a user selection signal and is coupled to the second comparator 814. When the count generated by second counter 812 is equal to the delay number selected by a user, a second acknowledge signal is generated. The second acknowledge signal is coupled to a multiplexer 820 which outputs either data stored in the memory 802 or known invalid data. It should be noted that passed delay number 1 and passed delay number 2 could be the same or different values.

Figure 9:
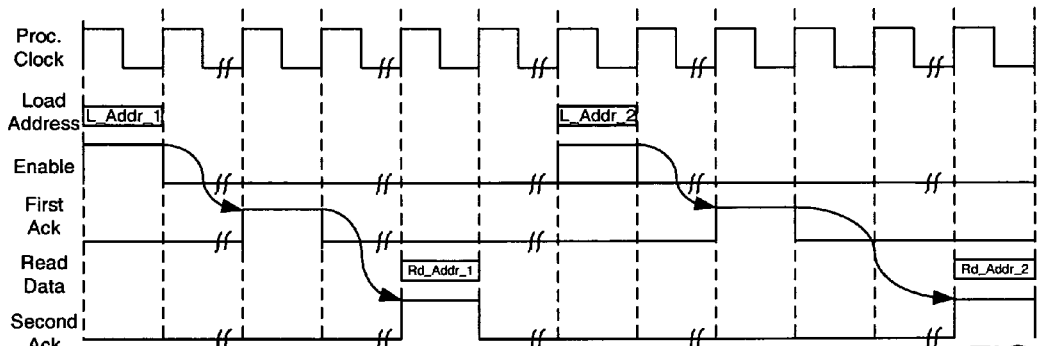
FIG. 9 is a timing diagram showing the verification of a read operation using the verification circuit of FIG. 8 according to an embodiment of the present invention.

As can be seen in the timing diagram of FIG. 9 which shows verifying a read operation using the verification circuit of FIG. 8, a processor clock and a load address are coupled to the verification circuit. After an enable signal triggers a read cycle, a first address (L_Addr_1) is provided to the memory 802. After a certain delay, such as a fixed delay selected by a user or a random delay based upon a random number generated by the random number generator 810, a first acknowledge signal is generated. After a second delay, such as a fixed delay selected by user or a random delay based upon a random number generated by the second random number generator 818, a second acknowledge signal is generated, and data from the memory location is output by the verification circuit. A second acknowledge signal may be generated after a second delay which may be different from the first delay. According to one aspect of the invention, the first acknowledge signal could be an address acknowledge signal, while the second acknowledge signal could be a data acknowledge signal. A second address (L_Addr_2) could also be coupled to the memory 802. As can be seen, another first acknowledge signal and second acknowledge signal could be generated by the verification circuit for the second address. Depending upon whether the delays are based upon first and second random number generators, the delays associated with the data in the second address may be different than the delays associated with data in the first address.

Figure 10:
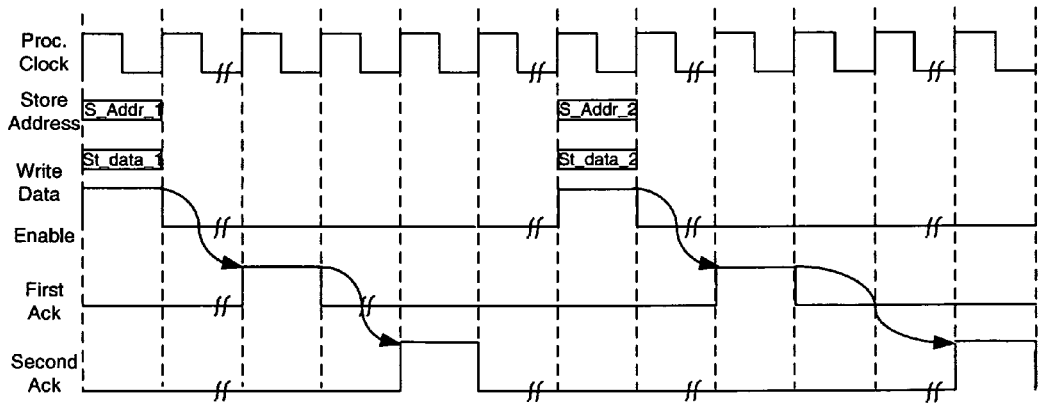
FIG. 10 is a timing diagram showing the verification of a write operation using the verification circuit of FIG. 8 according to an embodiment of the present invention.

As shown in the timing diagram of FIG. 10, a write operation using the verification circuit of FIG. 8 is performed to verify the data transfer operation of the block under test. A store address (S_Addr__1) and write data signal (St_Data__1) are coupled to a memory of the verification circuit. An enable signal triggers a write cycle for writing the input data to the store address of the memory. After a certain delay, which again could be a fixed delay selected by a user or a random delay based upon a random number generated by a random number generator, a first acknowledge signal is generated by the verification circuit, indicating that the address is valid, for example. A second acknowledge could also be generated after a second delay. The second acknowledge could represent a data write complete signal, for example. The second delay could also be a fixed delay selected by user or a random delay based upon a random number. As can be seen, the second acknowledge signal is generated by the verification circuit after a second delay, which may different from the first delay. Finally, a second store address (S_Addr__2) and write data signal (St_Data__2) could also be coupled to the memory 802, and first and second acknowledges generated for the second address. It should be noted that the delays associated with the acknowledges for the second address could vary from the delays associated with the first address depending upon the selection of delay numbers.

Turning now to FIG. 11, a flow chart shows a method of verifying a circuit implementing a data transfer protocol according to an embodiment of the present invention. The method of FIG. 11 could be implemented using any of the circuits described in FIGS. 1–10, or some other suitable circuit. A block under test that implements a variable latency data transfer protocol is provided at a step 1102. A verification circuit is then coupled to the block under test at a step 1104. Data from the block under test is coupled to the verification circuit at a step 1106. Variable latency data transfers to the block under test are enabled at a step 1108. It is then determined whether an acknowledge signal is received at the block under test after a predetermined delay at a step 1110. If an acknowledge signal is not received after a predetermined delay, then an error is generated at a step 1112. It is also determined whether valid data is received at the block under test after the acknowledge signal received at a step 1114. It is then confirmed that the block under test is successfully implementing the variable latency data transfer protocol at a step 1116.

Turning now to FIG. 12, a flow chart shows a method of verifying a circuit implementing a data transfer protocol using a single stage delay circuit according to an embodiment of the present invention. The method of FIG. 12 could be implemented using the circuit of FIG. 5, for example, or some other suitable circuit. An address from a block under test is coupled to a verification circuit at a step 1202. An enable signal from the block under test is coupled to a counter of the verification circuit to initiate a count at a step 1204. It is then determined whether a fixed delay number or a random delay number has been selected to be input to the verification circuit at a step 1206. If a fixed delay has been selected by the user, the fixed delay number is coupled to a comparator of the verification circuit at a step 1208. Otherwise, a random delay number is then coupled to the comparator of the verification circuit at a step 1210. The count is then compared to the delay number coupled to the comparator at a step 1212. It is then determined whether the count is equal to the delay number coupled to the comparator at a step 1214. If not, known invalid data is returned from the verification circuit to the block under test at a step 1216. If the count is equal to the delay number coupled to the comparator, an acknowledge signal is returned to the block under test at a step 1218. The acknowledge signal is also coupled to a multiplexer of the verification circuit at a step 1220 to select to return valid data to the block under test at a step 1222. Finally, it is confirmed that the block under test is successfully implementing the data transfer protocol at a step 1224.

Figure 13:
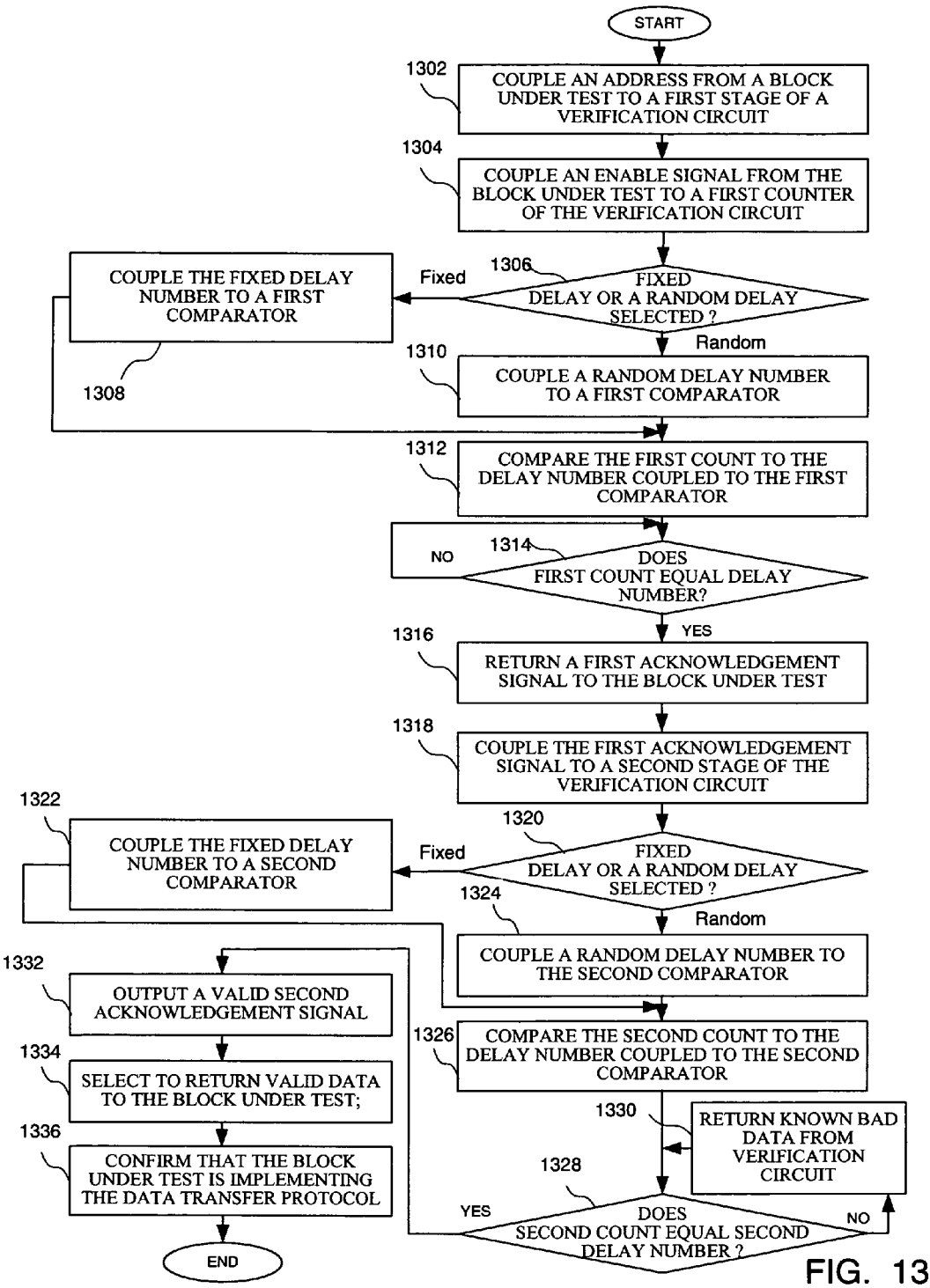
FIG. 13 is a flow chart showing a method of verifying a circuit implementing a data transfer protocol using a multi-stage delay circuit according to an embodiment the present invention.

Turning now to FIG. 13, a flow chart shows a method of verifying a circuit implementing a data transfer protocol using a multi-stage delay circuit according to an embodiment the present invention. The method of FIG. 13 could be implemented using the circuit of FIG. 8, for example, or some other suitable circuit. An address from a block under test is coupled to a first stage of a verification circuit at a step 1302. An enable signal from the block under test is also coupled to a first counter of the verification circuit to initiate a first count at a step 1304. It is then determined whether a fixed delay number or a random delay number has been selected to be input to the first stage of verification circuit at a step 1306. If a fixed delay has been selected by the user, the fixed delay number is then coupled to a first comparator of the verification circuit at a step 1308. Otherwise, a random delay number is coupled to the first comparator at a step 1310. The first count is compared to the delay number coupled to the first comparator at a step 1312. It is then determined whether the first count is equal the delay number coupled to the first comparator at a step 1314. If the count is equal to the delay number, a first acknowledge signal is returned to the block under test at a step 1316.

The first acknowledge signal is also coupled to a second stage of said verification circuit at a step 1318. It is then determined whether a fixed delay number or a random delay number been selected to be input to the second stage of verification circuit at a step 1320. If a fixed delay has been selected by the user, the fixed delay number is then coupled to a second comparator of the verification circuit at a step 1322. Otherwise, a random delay number is coupled to the second comparator at a step 1324. The second count is then compared to the delay number coupled to the second comparator at a step 1326. It is then determined whether the second count is equal the delay number coupled to the second comparator at a step 1328. If not, known bad data is returned from the verification circuit to the block under test at a step 1330. When the second count equals the delay number, a valid second acknowledge signal is output at a step 1332. The second acknowledge signal is also coupled to select to return valid data to the block under test at a step 1334. Finally, it is confirmed that the block under test is successfully implementing the data transfer protocol at a step 1336.

It can therefore be appreciated that the new and novel verification circuit and method of verifying a circuit implementing a data transfer protocol has been described. It will be appreciated by those skilled in the art that numerous alternatives and equivalents will be seen to exist which incorporate the disclosed invention. As a result, the invention is not to be limited by the foregoing embodiments, but only by the following claims.

We Claim:

1. A method of verifying a circuit implementing a data transfer protocol, said method comprising the steps of:
    implementing a variable latency data transfer protocol;
    coupling an address from a block under test to a first stage of a verification circuit;
    returning a first acknowledge signal from said first stage after a first delay;

coupling said first acknowledge signal to a second stage of said verification circuit;

returning a second acknowledge signal from said second stage after a second delay; and verifying that said block under test is implementing said variable latency data transfer protocol.

2. The method of claim 1 wherein said step of returning a first acknowledge signal from said first stage comprises a step of returning an address acknowledge signal.

3. The method of claim 2 wherein said step of returning a second acknowledge signal from said second stage comprises a step of returning a data acknowledge signal.

4. The method of claim 3 further comprising a step of returning data to said block under test.

5. The method of claim 1 further comprising a step of coupling an enable signal to a counter to initiate a count.

6. The method of claim 5 wherein said step of returning a first acknowledge signal comprises a step of comparing said count to a predetermined delay number.

7. The method of claim 5 wherein said step of returning a first acknowledge signal comprises a step of comparing said count to a random number.

8. The method of claim 1 further comprising a step of returning known invalid data to said block under test until said second acknowledge signal is generated.

9. A circuit for verifying a data transfer protocol, said circuit comprising:

a block under test;

a memory coupled to receive an address from said block under test;

a first counter coupled to receive an enable signal from said block under test;

a first comparator coupled to receive a first delay number and the output of said first counter, and generate a first acknowledge signal;

a second counter coupled to receive said first acknowledge signal from said first comparator;

a second comparator coupled to receive a second delay number and the output of said second counter; and a control circuit coupled to receive data associated with said address, said control circuit verifying that said block under test is implementing a data transfer protocol.

10. The circuit of claim 9 wherein said first delay number and said second delay number comprise random numbers.

11. The circuit of claim 9 wherein said first acknowledge signal comprises an address acknowledge signal.

12. The circuit of claim 9 further comprising a second acknowledge signal output by said second comparator, said second acknowledge signal comprising a data acknowledge signal.

13. The circuit of claim 12 further comprising a multiplexer coupled to receive output data from said memory and known invalid data, said multiplexer generating output data in response to a valid second acknowledge signal.

* * * * *